(12) United States Patent
Park et al.

(10) Patent No.: US 10,059,218 B2
(45) Date of Patent: Aug. 28, 2018

(54) CONTROL METHOD FOR OPTIMAL RESERVED CHARGING OF BATTERY AND VEHICLE THEREOF

(71) Applicants: HYUNDAI MOTOR COMPANY, Seoul (KR); KIA MOTORS CORPORATION, Seoul (KR)

(72) Inventors: Jun Yeon Park, Yongin-si (KR); Soung Han Noh, Suwon-si (KR); Young Jin Jang, Pohang-si (KR); Hyung Souk Kang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 141 days.

(21) Appl. No.: 15/212,705

(22) Filed: Jul. 18, 2016

(65) Prior Publication Data
US 2017/0129360 A1 May 11, 2017

(30) Foreign Application Priority Data
Nov. 9, 2015 (KR) .................. 10-2015-0156827

(51) Int. Cl.
*H01M 10/44* (2006.01)
*H01M 10/46* (2006.01)
(Continued)

(52) U.S. Cl.
CPC .......... *B60L 11/1861* (2013.01); *B60L 3/00* (2013.01); *B60L 11/12* (2013.01); *B60L 11/184* (2013.01);
(Continued)

(58) Field of Classification Search
USPC ................. 320/104, 109, 131, 141
See application file for complete search history.

(56) References Cited

U.S. PATENT DOCUMENTS

2011/0210698 A1  9/2011  Sakai
2013/0002188 A1  1/2013  Uyeki

FOREIGN PATENT DOCUMENTS

JP   2010154646 A   7/2010
JP   2011-259652 A  12/2011
(Continued)

OTHER PUBLICATIONS

Translation of JP-2011259652 (Dec. 22, 2011).*
(Continued)

*Primary Examiner* — Edward Tso
(74) *Attorney, Agent, or Firm* — McDermott Will & Emery LLP (57) ABSTRACT

A vehicle capable of more efficiently performing reserved charging and a charging control method thereof are disclosed. A charging control method of a vehicle including an electric motor and a battery for driving the electric motor includes setting reserved charging, setting a first charging start time on the assumption that an input voltage of an external charger is a first voltage, and starting charging of the battery when the first charging start time is reached. Upon determination that a second voltage which is an actual input voltage of the external charger is different from the first voltage, a second charging start time is set in consideration of the second voltage and estimated input current. Upon determination that the second charging start time is set, the battery is normally charged when the second charging start time is reached.

21 Claims, 6 Drawing Sheets

(51) Int. Cl.
   *B60L 11/18*   (2006.01)
   *B60L 3/00*    (2006.01)
   *B60L 11/12*   (2006.01)

(52) U.S. Cl.
   CPC ....... *B60L 11/1809* (2013.01); *B60L 11/1816* (2013.01); *B60L 11/1844* (2013.01); *B60L 2240/80* (2013.01); *B60L 2260/42* (2013.01); *B60L 2260/58* (2013.01); *Y02E 60/721* (2013.01); *Y02T 10/705* (2013.01); *Y02T 10/7005* (2013.01); *Y02T 10/7044* (2013.01); *Y02T 10/7072* (2013.01); *Y02T 10/7077* (2013.01); *Y02T 10/7258* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

FOREIGN PATENT DOCUMENTS

| | | |
|---|---|---|
| JP | 2012-050197 A | 3/2012 |
| JP | 2012-075268 A | 4/2012 |
| JP | 2013-146184 A | 7/2013 |
| KR | 10-2013-0078954 A | 7/2013 |
| KR | 10-2014-0077064 A | 6/2014 |
| KR | 10-2014-0082457 A | 7/2014 |
| KR | 10-1519780 B1 | 5/2015 |
| KR | 10-2015-0071121 A | 6/2015 |

OTHER PUBLICATIONS

Korean Office Action dated Aug. 24, 2017 issued in Korean Patent Application No. 10-2015-0156827.
Korean Notice of Allowance dated Jan. 10, 2018 issued in Korean Patent Application No. 10-2015-0156827 (with English translation).

* cited by examiner

CONTROL METHOD FOR OPTIMAL RESERVED CHARGING OF BATTERY AND VEHICLE THEREOF

CROSS-REFERENCE TO RELATED APPLICATION

This application claims the benefit of Korean Patent Application No. 10-2015-0156827, filed on Nov. 9, 2015, which is hereby incorporated by reference as if fully set forth herein.

TECHNICAL FIELD

The present disclosure relates to a vehicle capable of more efficiently performing reserved charging and a charging control method thereof.

BACKGROUND

Recently, a hybrid electric vehicle (HEV) is attracting considerable attention as an eco-friendly vehicle.

A hybrid vehicle generally refers to a vehicle using two power sources including an engine and an electric motor. Such a hybrid vehicle has improved mileage and power performance and decreases emissions as compared to a vehicle having only an internal combustion engine. Therefore, recently, many hybrid vehicles have been developed.

Among hybrid vehicles, a plug-in hybrid electric vehicle (PHEV) may be plugged in to charge a battery for driving an electric motor with external power.

In addition, an electric vehicle (EV) is also attracting considerable attention as another eco-friendly vehicle. Since the electric vehicle is generally driven using only an electric motor, a battery for driving the electric motor needs to be charged.

Such an EV or PHEV has a reserved charging function for automatically charging a battery when the vehicle is not used and when late night electricity is available, in consideration of departure time, for convenience of battery charging.

However, even if the reserved charging function is used when a late night electricity rate is applicable in consideration of departure time, the battery may not be sufficiently charged by the departure time according to an external environment (e.g., when input voltages of 110 V and 220 V are mixed). Charging logic is changed according to charger type (e.g., in-cable control box (ICCB) and EV supply equipment (EVSE)), confusing to a driver.

SUMMARY

Accordingly, the present disclosure is directed to a vehicle and a charging control method thereof that substantially obviate one or more problems due to limitations and disadvantages of the related art.

An object of the present disclosure is to provide a vehicle for more efficiently providing a reserved charging function, and a control method thereof.

Another object of the present disclosure is to provide a vehicle capable of providing an optimal reserved charging function in consideration of an actual charging environment, and a control method thereof.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a charging control method of a vehicle including an electric motor and a battery for driving the electric motor includes setting reserved charging, setting a first charging start time on the assumption that an input voltage of an external charger is a first voltage, and starting charging of the battery when the first charging start time is reached. Upon determination that a second voltage which is an actual input voltage of the external charger is different from the first voltage, a second charging start time is set in consideration of the second voltage and estimated input current when the second voltage which is an actual input voltage of the external charger is different from the first voltage. Upon determination that the second charging start time is set, the battery is normally charged when the second charging start time is reached.

According to another aspect of the present disclosure, there is provided a vehicle including an electric motor for driving wheels, a battery for supplying power to the motor, and an on-board charger (OBC) controller for setting a first charging start time on the assumption that an input voltage of an external charger is a first voltage when reserved charging is set, and starting charging of the battery when the first charging start time is reached. Upon determination that a second voltage which is an actual input voltage of the external charger is different from the first voltage, the OBC controller sets a second charging start time in consideration of the second voltage and estimated input current when the second voltage which is an actual input voltage of the external charger is different from the first voltage. Upon determination that the second charging start time is set, the OBC controller normally charges the battery when the second charging start time is reached.

At least one embodiment of the present disclosure includes the following effects.

In a vehicle, more efficient reserved charging may be performed.

In particular, when a reserved charging function is used, since an estimated charging time is readjusted according to an actual charging environment after starting charging, it is possible to avoid a period in which operation efficiency of a charger is low and to make the best use of a time at which a cheap electricity rate is applied.

The aspects of the present disclosure are only a part of the preferred embodiments of the present disclosure, and various embodiments based on technical features of the present disclosure may be devised and understood by one of ordinary skill in the art based on the detailed description of the present disclosure.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts, and a repeated description thereof will be omitted. The suffixes "module" and "unit" of elements herein are used for convenience of description and thus can be used interchangeably and do not have any distinguishable meanings or functions.

In describing the embodiments of the present disclosure, if it is determined that the detailed description of a related known function or construction renders the scope of the present disclosure unnecessarily ambiguous, the detailed description thereof will be omitted. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present disclosure.

In addition, in the present specification, the term "battery" refers to a battery for supplying power to an electric motor, not to a 12-V battery used to operate an electrical apparatus of a general vehicle, unless otherwise stated.

Prior to description of a vehicle charging system according to embodiments of the present disclosure, a general vehicle charging system will be described with reference to FIG. 1.

Figure 1:
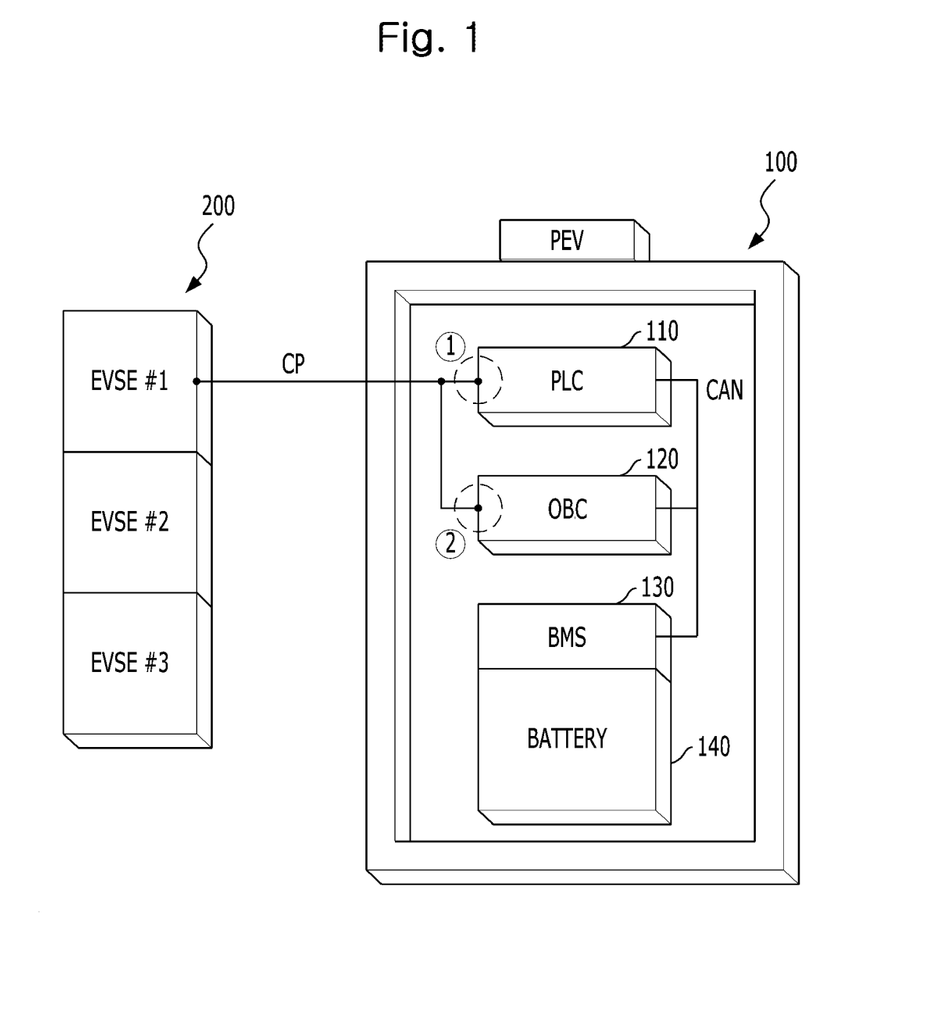
FIG. 1 is a diagram showing an example of a charging system structure of a general vehicle.

FIG. 1 is a diagram showing an example of a general charging system.

Although a charging system of an electric vehicle (EV) or a plug-in electric vehicle (PEV) is shown in FIG. 1, the charging system of FIG. 1 is similarly applicable to a PHEV except for parts related to an engine driven using fossil fuel.

Referring to FIG. 1, the charging system 100 of the EV may include a power line communication (PLC)/electric vehicle communication controller (EVCC) 110 for controlling quick charging, an on-board charger (OBC) controller 120 for controlling slow charging, a battery management system (BMS) 130 and a battery 140.

The PLC/EVCC 110, the OBC controller 120 and the BMS 130 may be connected to each other through controller area network (CAN) communication. In addition, the charging system 100 may be connected to a charger (electric vehicle supply equipment (EVSE)) 200 via a charging connector. The charger 200 transmits a pulse width modulation (PWM) signal to a vehicle via a control pilot (C/P) line and the vehicle determines whether slow charging or quick charging is performed through a duty ratio of the PWM signal (that is, a ratio of the H signal and L signal of the pulse width).

A process of performing general reserved charging based on the above-described configuration of the system will be described with reference to FIG. 2.

Figure 2:
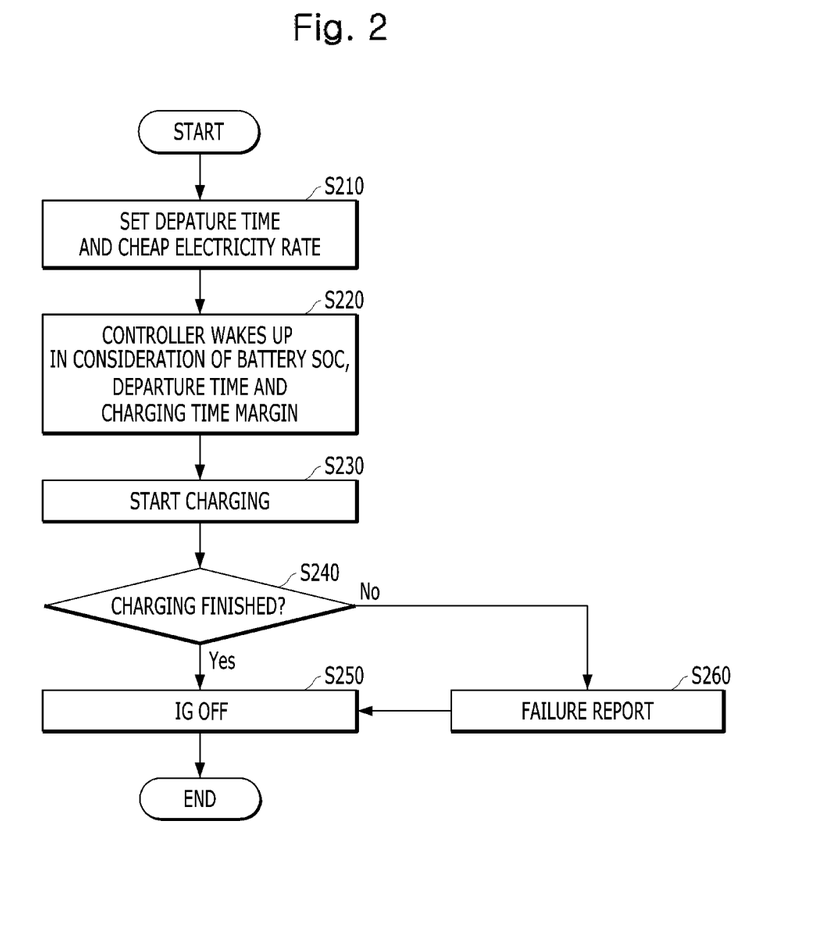
FIG. 2 is a flowchart illustrating an example of a process of performing a general reserved charging function.

FIG. 2 is a flowchart illustrating an example of a process of performing general reserved charging.

Referring to FIG. 2, as a driver inputs a departure time and sets a cheap electricity rate for using late night electricity (S210), the charging start time of the vehicle is determined in consideration of a current state of charge (SOC) of a battery, the input departure time and a change margin of a maximum charging time according to the current SOC. The OBC controller sleeps until the charging start time and wakes up at the charting start time (S220). Here, wake-up of the OBC controller may mean that the vehicle is switched to an IG-ON state.

The OBC controller wakes up to start charging (S230) and, when charging is finished (S240), the vehicle is switched to an IG-OFF state (S250). If charging up to a prescribed target charging amount (hereinafter, full charging is assumed for convenience) fails, a failure report message may be transmitted to a prescribed apparatus or a failure report procedure such as error code output may be performed (S260).

Here, the departure time and the cheap rate may be input through a user interface provided in the vehicle using an AVN (audio-video-navigation) system or may be received from an external device through the charger or a telematics server.

In the above-described process, although a marginal time is applied according to SOC, since the charging start time is determined on the assumption that the input current and voltage of the charger are predetermined values, full charging may fail if the estimated voltage of the charger and the actual voltage of the charger are different. For example, although the charging start time is set to a relatively late time on the assumption that the input voltage of the charger is 220 V, the actual input voltage of the charger may be 110V and thus full charging may not be accomplished by the departure time. In contrast, although the charging start time is set to a relatively early time on the assumption that the input voltage of the charger is 110 V, the actual voltage of the charger may be 220V and thus charging may start before a time when the electricity rate is discounted. Therefore, the electricity rate cannot be discounted.

Accordingly, in one embodiment of the present disclosure, on the assumption that the input voltage of the charger is a minimum value, the charging start time is calculated. When charging starts at the charging start time, actual input voltage and current are measured to measure charging power of the charger. The charging start time is reset based on the measured charging power of the charger.

According to one aspect of the present embodiment, if it is assumed that the input voltage of the charger includes 110 V and 220 V, a minimum voltage is 110 V. Of course, this is merely exemplary and more or less types of voltages may exist according to country or region and a smallest voltage may be used as the input voltage of the charger. The input voltage of the charger may be directly measured in the OBC controller upon starting charging. In some cases, the input current may be directly measured in the OBC controller and, in this case, a method of estimating the input voltage depending on whether the input current is greater or less than a threshold is applicable.

In addition, according to one aspect of the present embodiment, the input current may be estimated through a CP duty cycle. To this end, a reference table (or map)

indicating correspondence between CP duty cycle and input current may be used. The reference table may be prestored in the OBC controller.

Furthermore, according to one aspect of the present embodiment, the charging start time may be calculated by subtracting a predetermined margin and an estimated charging time from the departure time. Here, the estimated charging time may be calculated by dividing battery capacity by a value obtained by multiplying the input voltage, the input current and the charging efficiency of the OBC controller.

According to one aspect of the present embodiment, after the charging start time is set on the assumption of a low voltage (e.g., 110 V), charging starts at the charging start time. At this time, when the sensed voltage is a high voltage (e.g., 220 V), the OBC controller may recalculate the charging time based on the high voltage. At this time, if it is determined that full charging is possible until a prescribed departure time when charging starts at a time at which a cheap electricity rate is applied, the OBC controller may reset the charging start time to a time when the cheap electricity rate starts or a subsequent time thereof. In this case, the OBC controller may perform low-load charging until the reset charging start time in order to reduce charging costs, and start normal-load charging when the reset charging start time is reached.

Figure 3:
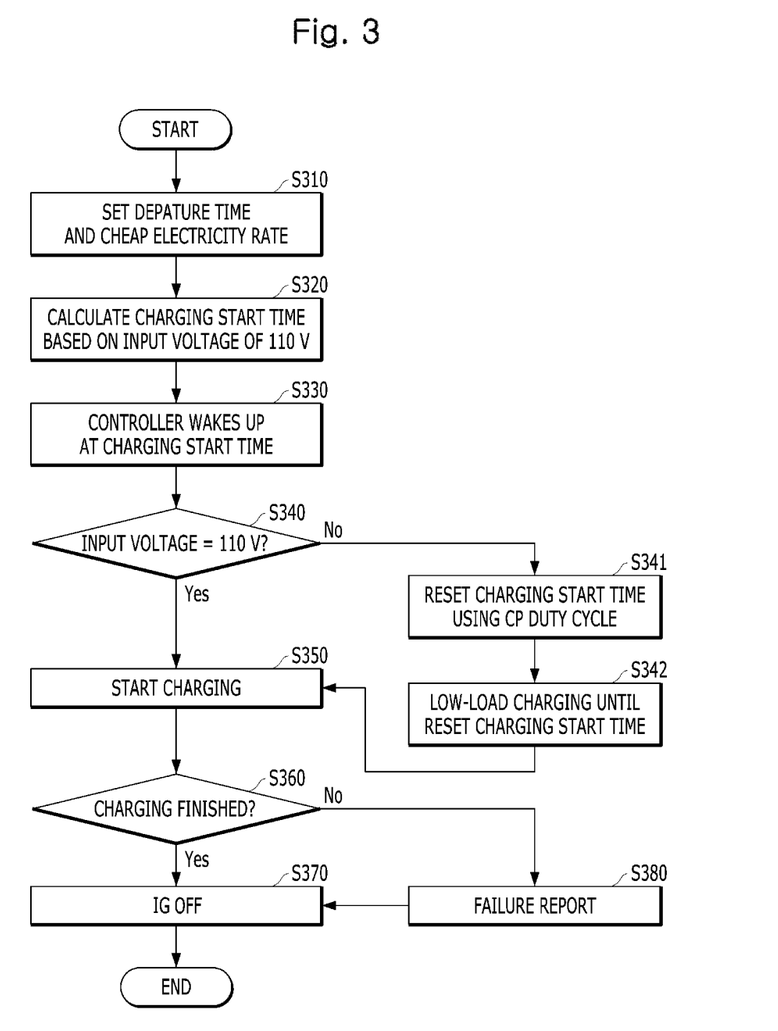
FIG. 3 is a flowchart illustrating an example of an efficient charging control process in a vehicle according to one embodiment of the present disclosure.

The flowchart of the charging control method according to the present embodiment is shown in FIG. 3.

FIG. 3 is a flowchart illustrating an example of an efficient charging control process in a vehicle according to one embodiment of the present disclosure. In FIG. 3, assume that the minimum value of the input voltage is 110 V and the maximum value of the input voltage is 220 V.

Referring to FIG. 3, first, a departure time may be input by a driver and reserved charging using a cheap electricity rate may be set (S310).

The OBC controller may calculate a charging start time on the assumption that the input voltage of the charger is 110 V (S320). Here, the current SOC of the battery may be considered.

The OBC controller stands by in a sleep mode until the charging start time, wakes up at the charging start time (S330) to start charging, and measures the input voltage (S340). When the input voltage is 110 V, the OBC controller may start charging without change (S350). When charging is finished (S360), the vehicle is switched to the IG-OFF state (S370).

A failure report procedure S380 performed when charging fails is similar to step S260 of FIG. 2 and thus a detailed description thereof will be omitted.

If the input voltage is not 110 V (e.g., 220 V), the OBC controller obtains charging power using the input voltage and the current estimated through the CP duty cycle and recalculates and resets the charging start time using the charging power (S341). At this time, as described above, when the charging start time is recalculated, the time at which the cheap electricity rate is applied may be considered.

When the charging start time is reset, the OBC controller stands by while performing low-load charging until the reset charging start time (S342) and then starts normal charging when the reset charging start time is reached (S350).

Next, a process of performing charging when the above-described charging control method is applied will be described with reference to FIGS. 4A and 4B.

Figure 4A:
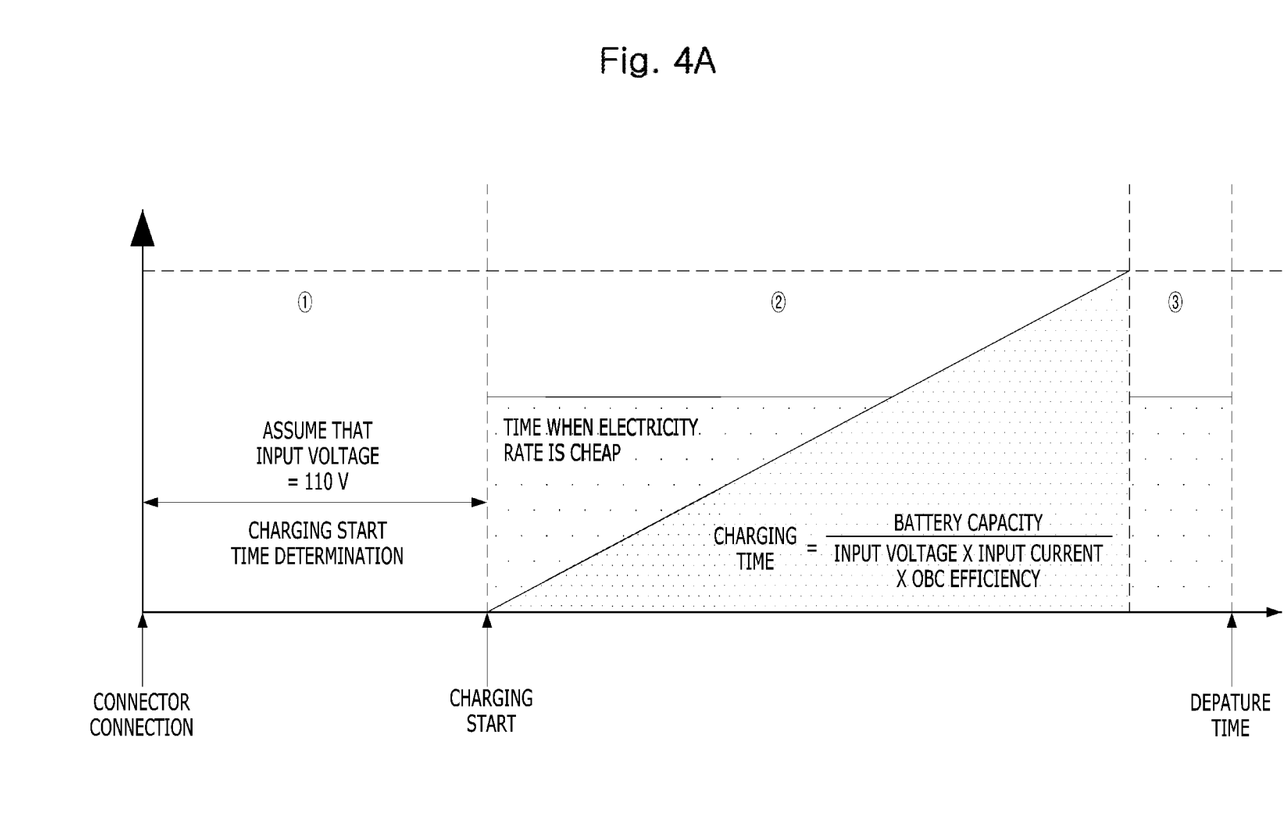
FIGS. 4A and 4B are diagrams showing an example of a process of performing charging according to an input voltage when applying a charging control method according to one embodiment of the present disclosure.
Figure 4B:
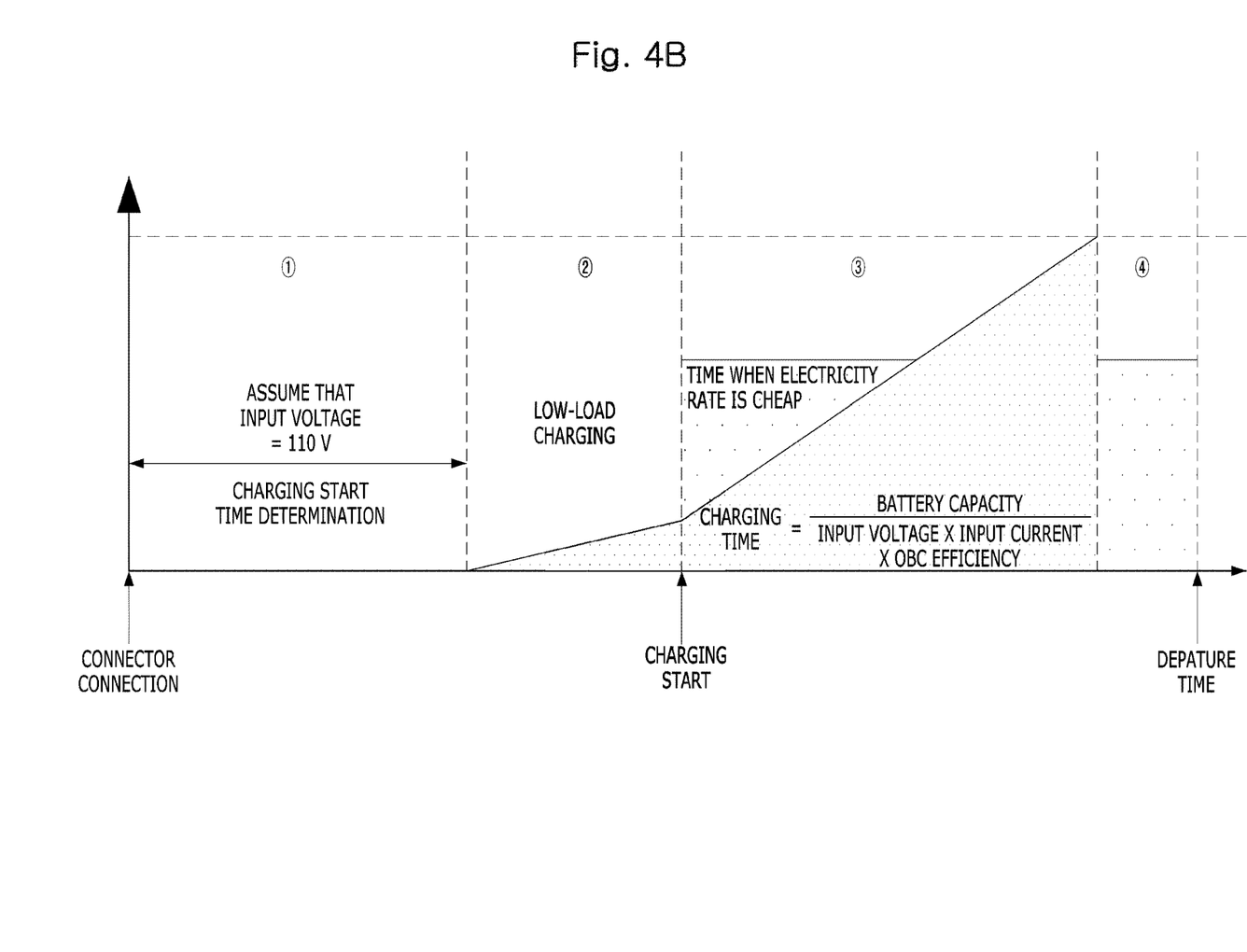

FIGS. 4A and 4B are diagrams showing an example of a process of performing charging according to an input voltage when applying a charging control method according to one embodiment of the present disclosure.

In FIG. 4A, assume that the actual input voltage of the charger is 110 V.

Referring to FIG. 4A, when the connector of the charger is connected and the departure time and the cheap electricity rate are set, the OBC controller determines the charging start time on the assumption that the input voltage is 110 V. At this time, if the estimated charging time ② is sufficiently included in a time obtained by subtracting a margin a before the departure time from a period of time ②+③ when the electricity rate is cheap, the OBC controller may determine the charting start time within the period of time when the electricity rate is cheap. The OBC controller in the sleep mode during a period (before the charging start time starts charging when the charging start time is reached. If the estimated voltage and the actual voltage are equal, charging may immediately start.

In FIG. 4B, assume that the actual voltage of the charger is 220 V.

Referring to FIG. 4B, when the connector of the charger is connected and the departure time and the cheap electricity rate are set, the OBC controller determines the charging start time on the assumption that the input voltage is 110 V. At this time, if an estimated charting time ②+③ is not included in a period of time ③+④ when the electricity rate is cheap in consideration of a margin ④ before the departure time, the OBC controller may set the charging start time to a time before the electricity rate is cheap, in consideration of the departure time and the margin. The OBC controller in the sleep mode during a period (before the charging start time starts charging when the charging start time is reached. If the estimated voltage and the actual voltage are different, the charging start time is reset using the actual voltage and the current estimated through the CP duty cycle. Thereafter, low-load charging is performed during the period of time ② remaining until the reset charging start time. The OBC controller may start charging when the reset charging start time is reached.

The general OBC controller includes a booster (BS) which is an input terminal and a zero voltage switching (ZVS) full-bridge PWM circuit which is an output terminal, which is implemented through simple control and using a relatively small number of parts. However, in some cases, ZVS of the output terminal may fail upon low-load charging, causing switching loss and, in the worst case, stopping OBC operation. This leads to deterioration in charging efficiency.

Accordingly, in another embodiment of the present disclosure, if low-load charging is performed according to resetting of the charging start time, a method of turning only the output terminal of the OBC controller off during the low-load charging period is proposed. That is, the charger supplies power to the input terminal of the OBC controller when the first calculated charging start time is reached but the output terminal of the OBC controller is turned off until the reset charging start time, such that the battery is not actually charged.

Figure 5:
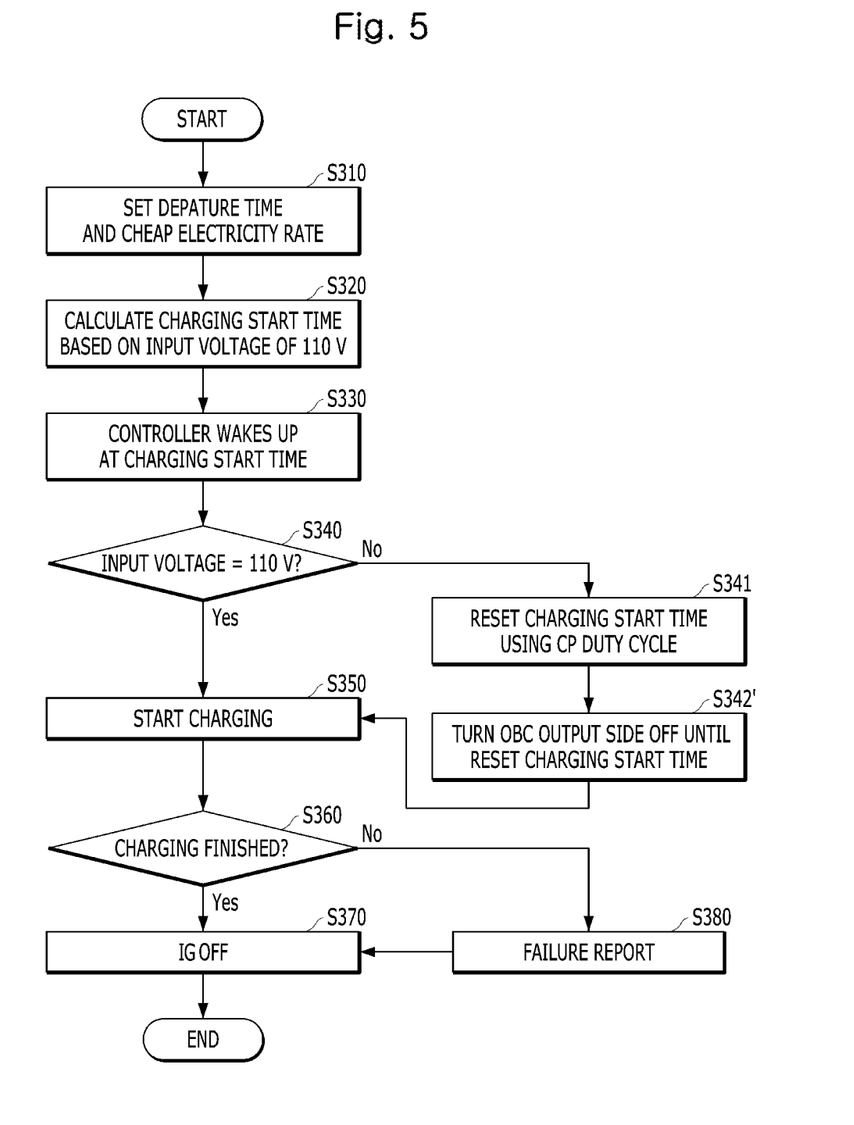
FIG. 5 is a flowchart illustrating an example of an efficient charging control process in a vehicle according to another embodiment of the present disclosure.

The flowchart of this operation is shown in FIG. 5.

FIG. 5 is a flowchart illustrating an example of an efficient charging control process in a vehicle according to another embodiment of the present disclosure.

In FIG. 5, assume that the minimum value of the input voltage is 110 V and the maximum value of the input voltage is 220 V. FIG. 5 is similar to FIG. 3 except for step S342' and a repeated description will be omitted for clarity.

Referring to FIG. 5, when the charging start time is reset due to a difference between an estimated input voltage and an actual input voltage (S341), the OBC controller may turn the output terminal off until the reset charging start time (S342'). When the reset charging start time is reached, the OBC controller may activate the output terminal (ON) to start charging (S350).

According to the above-described embodiments of the present disclosure, it is possible to reduce charging costs by making the best use of a reserved charging function in consideration of the departure time and the cheap electricity rate. In addition, it is possible to increase a rate of success of full charging by estimating the charging time based on actual measurement, to make the best use of a cheap electricity rate and to unify a charging logic regardless of charger type (input voltage/country/method). If the output terminal of the OBC controller is temporarily turned off, it is possible to reduce energy loss due to stopping of OBC operation upon low-load charging and to increase durability of the OBC controller.

The present disclosure may be implemented as code that can be written to a computer-readable recording medium and can thus be read by a processor. The computer-readable recording medium may be any type of recording device in which data can be stored in a computer-readable manner. Examples of the computer-readable recording medium include a hard disk drive (HDD), a solid state drive (SSD), a silicon disk drive (SDD), ROM, a RAM, a CD-ROM, a magnetic tape, a floppy disk, an optical data storage, and a carrier wave (e.g., data transmission over the Internet).

Accordingly, the above detailed description is not to be construed as limiting the present disclosure in all aspects and should be considered as being exemplary. The scope of the present disclosure should be determined by reasonable interpretation of the accompanying claims and all equivalent modifications made without departing from the present disclosure should be included in the following claims.

What is claimed is:

1. A charging control method of a vehicle including an electric motor and a battery for driving the electric motor, the charging control method comprising:
    setting reserved charging;
    setting a first charging start time on an assumption that an input voltage of an external charger is a first voltage;
    starting charging of the battery when the first charging start time is reached;
    upon determination that a second voltage which is an actual input voltage of the external charger is different from the first voltage, setting a second charging start time in consideration of the second voltage and estimated input current; and
    upon determination that the second charging start time is set, normally charging the battery when the second charging start time is reached.

2. The charging control method according to claim 1, further comprising entering, by an on-board charger (OBC) controller, a sleep mode until the first charging start time, when the first charging start time is set.

3. The charging control method according to claim 1, wherein the setting of the reserved charging includes setting a departure time and use of a late night electricity rate.

4. The charging control method according to claim 3, wherein the setting of the first charging start time includes:
    calculating a first estimated charging time required to reach a target charging state in consideration of the first voltage and a state of charge (SOC) of the battery; and
    determining the first charging start time in consideration of the calculated first estimated charging time, the departure time, and a time at which the late night electricity rate is applied.

5. The charging control method according to claim 4, wherein the determining of the first charging start time is performed in consideration of a predetermined margin from the departure time.

6. The charging control method according to claim 4, wherein the determining of the first charging start time is performed such that the first estimated charging time is maximized in a time at which late night electricity rate is applied.

7. The charging control method according to claim 3, wherein the setting of the second charging start time includes:
    calculating a second estimated charging time required to reach a target charging state in consideration of the second voltage, the estimated input current and a state of charge (SOC) of the battery; and
    determining the second charging start time in consideration of the calculated second estimated charging time, the departure time and a time at which a late night electricity rate is applied.

8. The charging control method according to claim 1, wherein the estimated input current is estimated using a control pilot duty cycle.

9. The charging control method according to claim 1, wherein:
    upon determination that the second charging start time is set, the started charging of the battery when the first charging start time is reached is a low-load charging from when the second charging start time is set to when the second charging start time is reached, and
    upon determination that the second charging start time is not set, the started charging of the battery when the first charging start time is reached is normal charging.

10. The charging control method according to claim 1, further comprising:
    turning an output terminal of an on-board charger (OBC) controller off from when the second charging start time is set to when the second charging start time is reached; and
    turning the output terminal on when the second charging start time is reached.

11. A vehicle comprising:
    an electric motor for driving wheels;
    a battery for supplying power to the motor; and
    an on-board charger (OBC) controller for setting a first charging start time on the assumption that an input voltage of an external charger is a first voltage when reserved charging is set; starting charging of the battery when the first charging start time is reached; upon determination that a second voltage which is an actual input voltage of the external charger is different from the first voltage, setting a second charging start time in consideration of the second voltage and estimated input current when the second voltage which is an actual input voltage of the external charger is different from the first voltage; and upon determination that the second charging start time is set, normally charging the battery when the second charging start time is reached.

12. The vehicle according to claim 11, wherein the on-board charger (OBC) controller enters a sleep mode until the first charging start time, when the first charging start time is set.

13. The vehicle according to claim 11, wherein the reserved charging is set along with a departure time and use of a late night electricity rate.

14. The vehicle according to claim 13, wherein the OBC controller calculates a first estimated charging time required to reach a target charging state in consideration of the first voltage and a state of charge (SOC) of the battery and determines the first charging start time in consideration of the calculated first estimated charging time, the departure time, and a time at which the late night electricity rate is applied.

15. The vehicle according to claim 14, wherein the OBC controller performs the first charging start time in consideration of a predetermined margin from the departure time.

16. The vehicle according to claim 14, wherein the OBC controller determines the first charging start time such that the first estimated charging time is maximized in a period of time at which late night electricity rate is applied.

17. The vehicle according to claim 13, wherein the OBC controller calculates a second estimated charging time required to reach a target charging state in consideration of the second voltage, the estimated input current and a state of charge (SOC) of the battery and determines the second charging start time in consideration of the calculated second estimated charging time, the departure time and a time at which a late night electricity rate is applied.

18. The vehicle according to claim 11, wherein the estimated input current is estimated using a control pilot duty cycle.

19. The vehicle according to claim 11, wherein upon determination that the second charging start time is set, the started charging of the battery performed by the OBC controller when the first charging start time is reached is a low-load charging from when the second charging start time is set to when the second charging start time is reached, and upon determination that the second charging start time is not set, the OBC controller performs normal charging.

20. The vehicle according to claim 11, wherein the OBC controller turns an output terminal of the on-board charger (OBC) controller off from when the second charging start time is set to when the second charging start time is reached and turns the output terminal on when the second charging start time is reached.

21. A computer-readable recording medium having recorded thereon a program for executing the charging control method according to claim 1.

* * * * *